United States Patent
Park

[11] Patent Number: 5,949,642
[45] Date of Patent: Sep. 7, 1999

[54] HINGE ASSEMBLY FOR A PORTABLE COMPUTER

[75] Inventor: Sang-Seok Park, Suwon, Rep. of Korea

[73] Assignee: SamSung Electronics Co., Ltd., Kyungki-do, Rep. of Korea

[21] Appl. No.: 08/950,751

[22] Filed: Oct. 15, 1997

[30] Foreign Application Priority Data

Oct. 16, 1996 [KR] Rep. of Korea ............... 96-46176

[51] Int. Cl.[6] ................ G06F 1/16; H05K 7/16
[52] U.S. Cl. ............................ 361/681; 16/223
[58] Field of Search .................... 361/681, 680, 361/679; 16/387, 389, 392, 340, 337, 383, 382, 223

[56] References Cited

U.S. PATENT DOCUMENTS

| | | | |
|---|---|---|---|
| 5,109,570 | 5/1992 | Okada et al. | 16/289 |
| 5,195,213 | 3/1993 | Ohgami et al. | . |
| 5,199,888 | 4/1993 | Condra et al. | 439/142 |
| 5,237,486 | 8/1993 | LaPointe et al. | 361/681 |
| 5,301,132 | 4/1994 | Akahane | 364/708 |
| 5,379,183 | 1/1995 | Okonsky et al. | . |
| 5,498,165 | 3/1996 | Tseng | 439/31 |
| 5,566,048 | 10/1996 | Esterberg et al. | . |

*Primary Examiner*—Lynn D. Feild
*Assistant Examiner*—Jagdish Patel
*Attorney, Agent, or Firm*—Robert E. Bushnell, Esq.

[57] ABSTRACT

A portable, lap-top constructed with a body that encases the computer and a keyboard, and a display housing that encases a variable visual display driven by the computer. A hinge assemble rotatably connects the body with the housing for the display. The hinge assembly includes a horizontal bracket, a hinge member formed on the horizontal bracket, a pivot-bracket assembly, including a pivot and a bracket, rotatably connected to one side of the hinge member, perforated by a plurality of holes that allow the assembly to be attached to the body housing the computer. The hinge assembly is electrically joined with a mother board of the computer by a bolt inserted through holes formed in a bottom case of the body and the mother board.

13 Claims, 5 Drawing Sheets

HINGE ASSEMBLY FOR A PORTABLE COMPUTER

CLAIM OF PRIORITY

This application makes reference to, incorporates the same herein, and claims all benefits accruing under 35 U.S.C. §119 from an application entitled Display and Main Body Connection of a Portable Computer earlier filed in the Korean Industrial Property Office on Oct. 16, 1996, and there duly assigned Ser. No. 96-46176 by that Office.

BACKGROUND OF THE INVENTION

1. Technical Field

The present invention relates to the connection between a visual display and the main body of a portable computer.

2. Discussion of the Related Art

Portable computers, such as lap-tops, are being used increasingly as more and more people require mobility in performing work duties. Generally, a portable computer includes a body portion with a keyboard and display portion rotatably mounted on one side of the body portion such that the display portion can spread open from the body portion. The display portion, including a liquid crystal display (LCD), is rotated to define an opened or closed position relative to the body portion with a rotatable hinge assembly fixed on the body portion.

Exemplars of the contemporary practice in the art include U.S. Pat. No. 5,379,183 for Combination I/o Plate/Lid Hinge Structure for a Notebook Computer issued to Okonsky et al., which includes a bottom-mounted hinge bracket with mounting tabs connected to circuit boards of the computer system as well as to an I/O plate. U.S. Pat. No. 5,566,048 for Hinge Assembly For a Device Having a Display issued to Esterberg et al., includes a hinge mechanism with an attachment boss that mounts on the bottom surface of a computer case. The hinge does ground the main board. U.S. Pat. No. 5,195,213 for Hinge Device for Coupling Rotatable Member to Another Member issued to Ohgami et al., includes brackets which mount on the bottom and side, respectively, of a computer housing, to which a shaft is rotatably mounted. The hinges do not ground the main board. U.S. Pat. No. 5,483,253, for Portable Information Processing Apparatus and Liquid Crystal Display Device, issued to Suganuma et al., describes a similar hinge, however, the boss extends from the bottom of the main body housing to a tab extending from the hinge body. U.S. Pat. No. 5,173,837, for Hinge with Two-Toothed Clutch Spring for Suppressing Electromagnetic Interference for Laptop Personal Computer, issued to Blackwell et al., describes a hinge that mounts to the top of a main body housing of a portable computer. U.S. Pat. No. 5,481,430, for Portable Computer Having Keyboard and Coordinate Input Tablet Hingedly Connected to a Main Body Case through a Groove, and U.S. Pat. No. 5,594,619, for Portable Computer Comprising Keyboard and Coordinate Input Tablet Hingedly Connected to a Main Body Case through a Junction Defining a Linear Groove therethrough, both issued to Miyagawa et al., and U.S. Pat. No. 5,237,486, for Structural Frame for Portable Computer, issued to LaPointe et al., describe hinges bolted to the side of a main body housing of a portable computer.

I have found that there is a drawback in the hinge assembly for the typical portable computer because the top case is subjected to undue stresses as it is being opened and subsequently while maintained in an opened state for a long period of time. The stress causes the top case bearing the relatively heavy liquid crystal display to become deformed as a result of the weight of the display being concentrated on the hinge-assemblies that are mounted on both sides of the top case so that the display portion is supported only by the top case. This problem is aggravated when the top case is thin and weak.

I have noticed that another drawback of the typical portable computer is that electromagnetic interference (EMI) is not fully shielded. Electromagnetic waves from the main circuit board are not sufficiently blocked because the main circuit board is joined only to the bottom of the computer's case, thus inadequately grounding any induced current. This results in substantial electrical interference with electromagnetic waves processed by other elements in the computer. Also, there is a risk that these electromagnetic waves are harmful to humans.

SUMMARY OF THE INVENTION

The present invention has been made in an effort to solve the above problems.

It is therefore an object of the present invention is to provide an improved hinge assembly connecting the housing for the visual display with the main housing of a portable computer.

It is another object to provide a structurally sound rotatable connection between the visual display and main body of a portable computer that decreases load density on the top case when the visual display is rotatably moved relative to the main body.

It is still another object to provide a structurally sound rotatable connection between the visual display and main body of a portable computer that exhibits a decrease in concentration of stress in specific areas of the housing for the main body over long periods while the display portion is in the open position.

It is yet another object to provide a hinge assembly for a portable computer that stabilizes the operations of each element of the assembly.

It is still yet another object to provide a hinge assembly that decreases the harmful effects of electromagnetic waves by improving electromagnetic shielding.

These and other objects may be achieved with a variable visual display and main body connection for a portable computer including a main body housing, a display housing rotatably connected to the main body housing, and a hinge assembly joined to an inside of the display housing and a bottom of the main body housing to enable rotation of the display housing with respect to the main body housing. The hinge assembly includes a horizontal bracket, a hinge member formed on the horizontal bracket, a pivot-bracket assembly, including a pivot and a bracket, rotatably connected to one side of the hinge member and which has a plurality of joining holes for mounting inside the display housing, a support formed downward from the horizontal bracket and having a bolt hole, and a bolt insertion hole formed in the horizontal bracket. Further, a bracket is fixed in the main body housing, to which the hinge assembly is coupled, via the bolt insertion hole of the horizontal bracket. Also, the hinge assembly is electrically joined with a main board by a bolt inserted through holes formed in a bottom case of the main body housing and the main board and coupled to the bolt hole of the support.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 4:
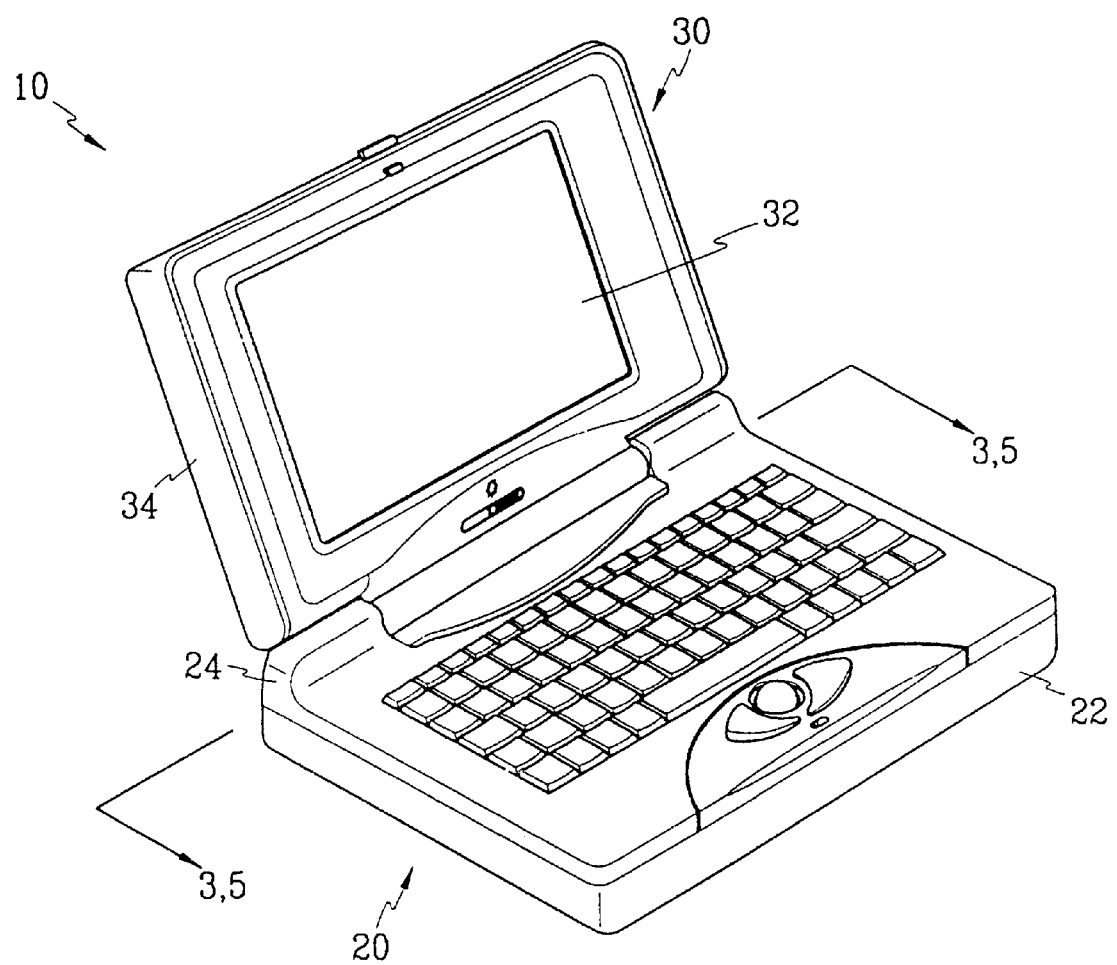
FIG. 4 is a perspective view of a typical portable computer which may incorporate the present invention.

Referring to FIG. 4, a typical portable computer 10 includes a main body housing 20 and a display portion 30 rotatably mounted on one side of the main body housing 20. The main body housing 20 includes a bottom case 22 and a top case 24 integrally formed with the bottom case 22. The display portion 30 includes a display portion housing 34 and an LCD 32 integrally mounted in the display portion housing 34.

The portable computer 10 is shown, in FIG. 4, as it would be when in use (i.e. when the display portion 30 is spread open from the main body housing 20). When not in use, the display portion 30 is folded over the main body housing 20.

Figure 5:
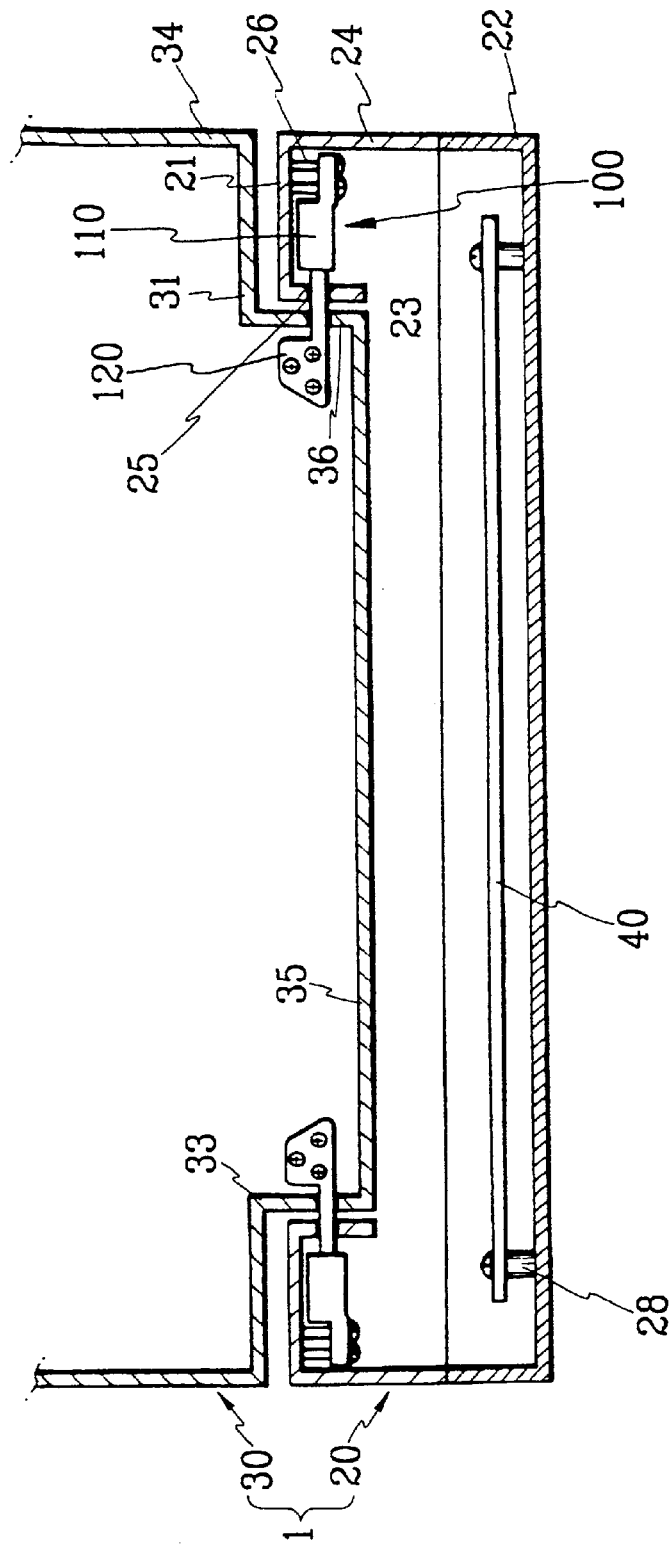
FIG. 5 is a cross-sectional detail view of a typical display and main body housing, drawn along line 3,5—3,5 of FIG. 4.

Referring to FIG. 5, the opening and closing of the display portion 30 of a typical computer 1 relative to the main body housing 20 is realized through hinge assemblies 100 fixed on the main body housing 20 and the display portion 30. The display portion 30 has a first lower panel 31, a downwardly-extending panel 33 and a second lower panel 35. The main body housing 20 has an upper panel 21 and a downwardly-extending flange 23. The first lower panel 31 and upper panel 21 generally are parallel. The downwardly-extending panel 33 and downwardly-extending flange 23 generally are parallel.

A hinge assembly 100 is mounted at both ends of the top case 24 of the main body housing 20. An extreme, outside end of a hinge portion 110 is coupled to a boss 26 which extends inwardly from the top case 24. A rotation part 120, rotatably mounted to the hinge part 110, extends through an aperture 25 of the downwardly-extending flange 23 and through a second aperture 36 of the downwardly-extending panel 33, and is fixed to a bottom of the display portion housing 34. The display portion 30 is thus rotatably connected to the main body housing 20 such that the display portion 30 may be opened from and closed against the main body housing 20. Finally, a main circuit board 40 is installed in the main body housing 20 with the boss 28 protruding from a bottom of the bottom case 22.

Preferred embodiments of the present invention will now be described in detail with reference to the accompanying drawings.

Figure 1:
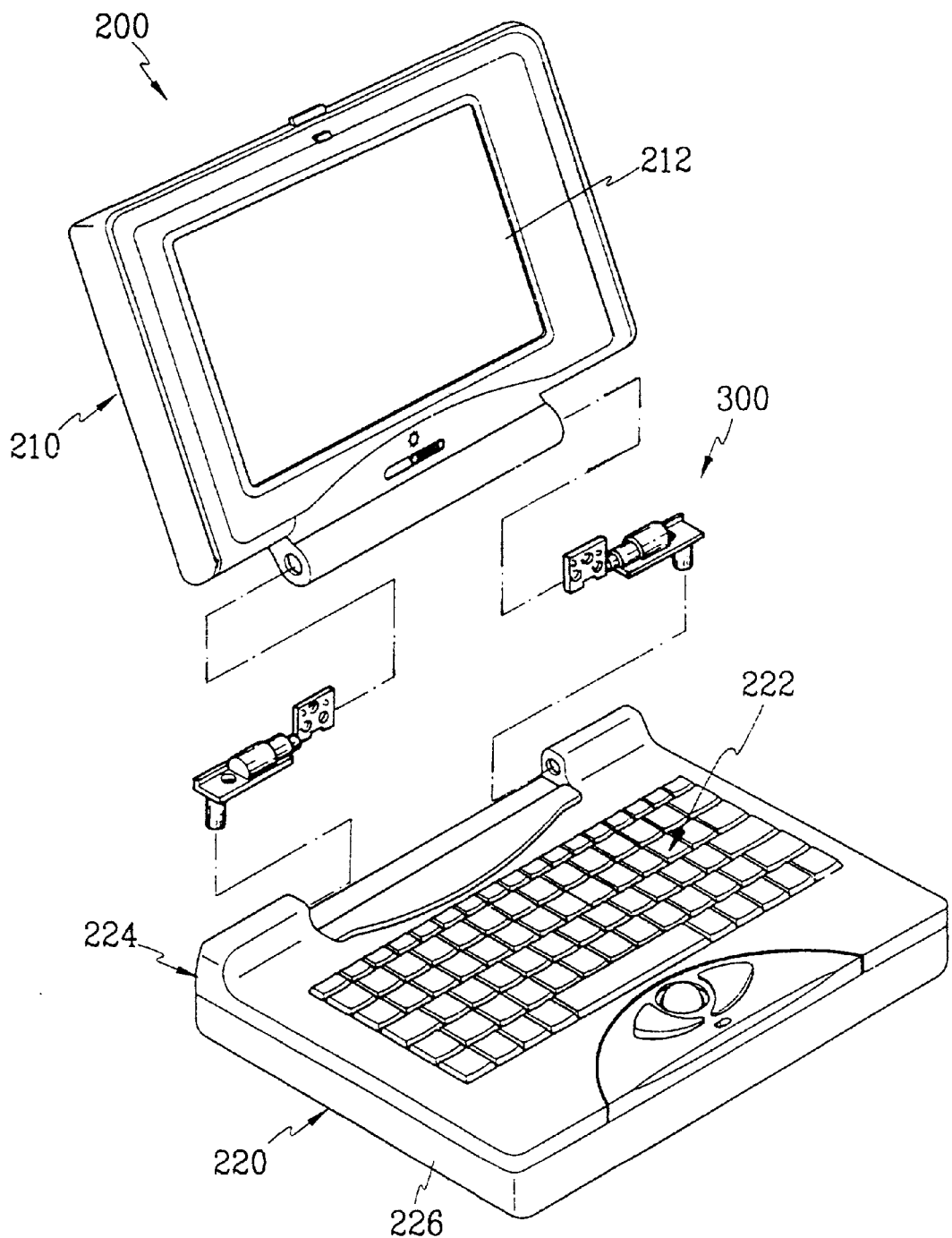
FIG. 1 is a partial exploded perspective view of a portable computer constructed according to the principles of the present invention.

Referring to FIG. 1, reference numeral 200 indicates a portable computer according to a preferred embodiment of the present invention. The portable computer 200 of the present invention includes a display housing 210 and a main body housing 220 to which the display housing 210 is rotatably mounted. The display housing 210 includes a liquid crystal display (LCD) screen 212. The main body housing 220 includes a top case 224, a keyboard 222, and a bottom case 226. The mounting of the display housing 210 to the main body housing 220 is realized through a hinge assembly 300.

Figure 2:
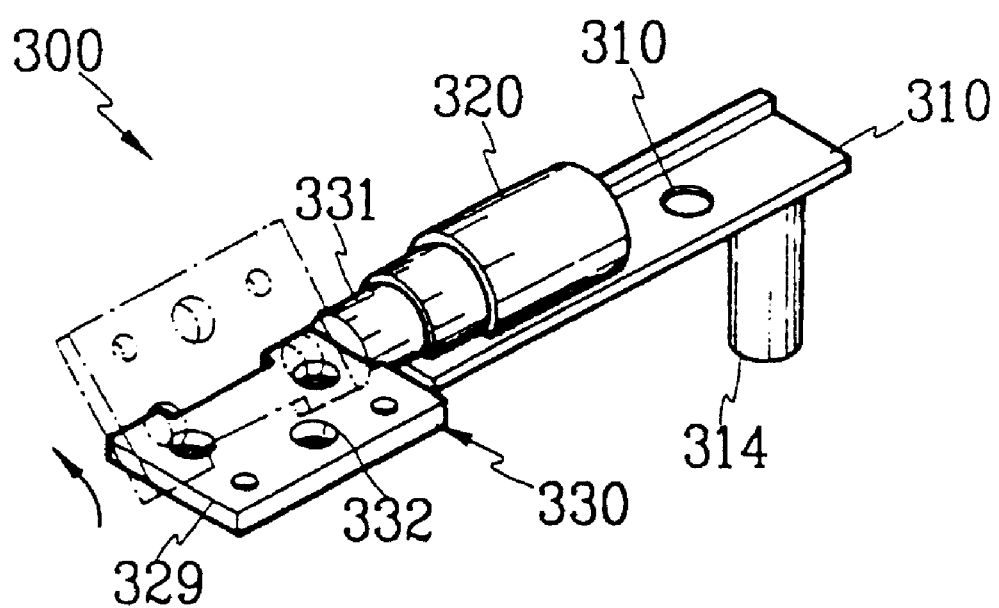
FIG. 2 is a top left front perspective view of a hinge assembly according to the present invention.

Referring also to FIG. 2, the hinge assembly 300 includes a horizontal bracket 310, a hinge member 320 joined to the horizontal bracket 310, and a pivot-bracket assembly 330, including a pivot 331 and a bracket 329, rotatably connected to one side of the hinge member 320 and having a plurality of joining holes 332. A support 314, formed integrally with the horizontal bracket 310, extends downward from an end of thereof. A threaded bolt hole 319 (see FIG. 3) is formed in the support 314 at a predetermined depth. Also, a bolt insertion hole 312 is formed in the horizontal bracket 310 at a location between the support 314 and hinge member 320.

The pivot-bracket assembly 330 rotates on the hinge member 320, as shown in phantom line in FIG. 2. It is possible for the pivot-bracket assembly 330 to rotate up to about 125°.

Figure 3:
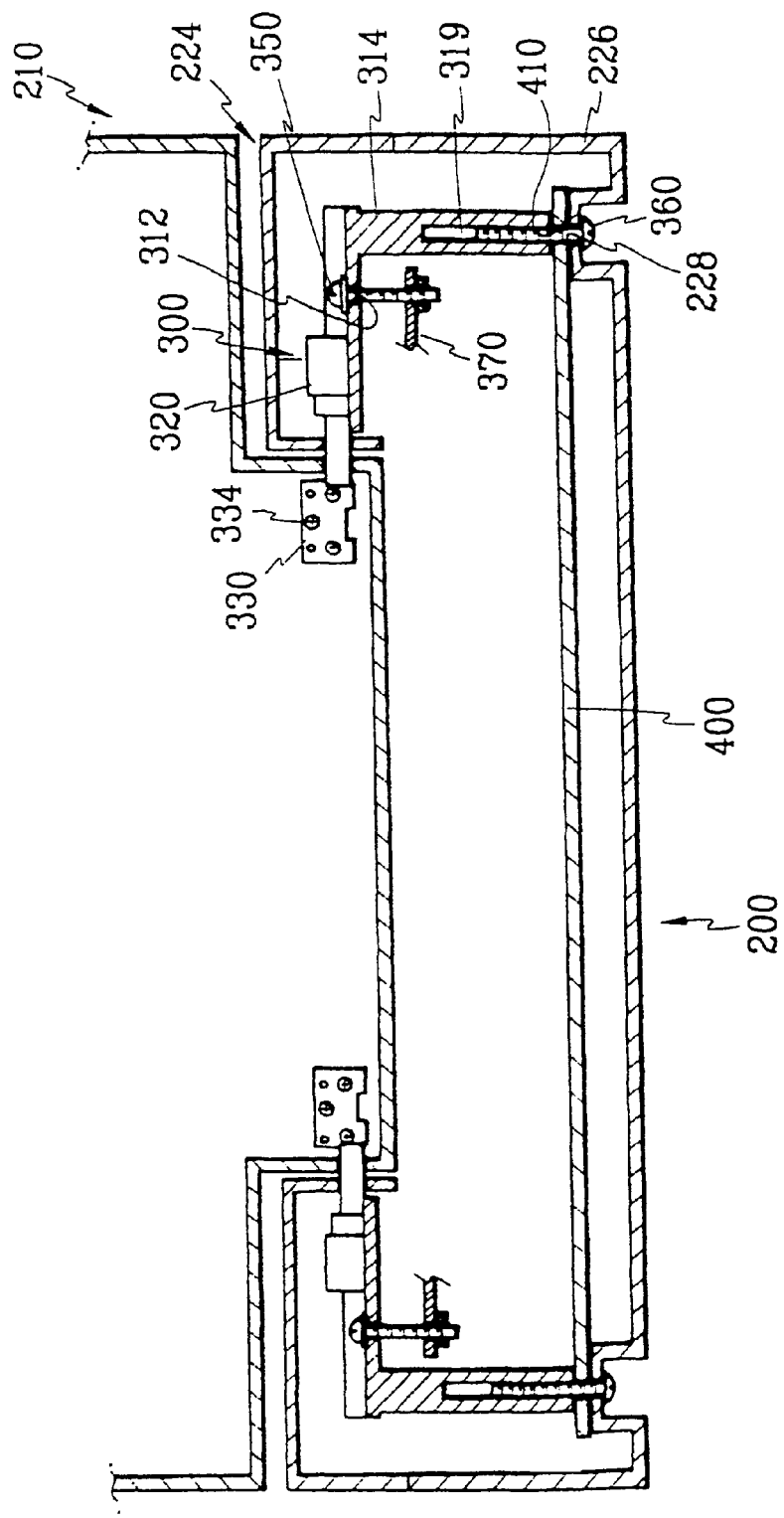
FIG. 3 is a cross-sectional detail view of display and main body housing including the hinge of present invention, drawn along line 3,5—3,5 of FIG. 4.

Referring to FIG. 3, there is shown the connection of the display housing 210 and the main body housing 220 with the above hinge assembly 300. As shown, the support 314 is joined to bottom case 226 of the main body housing 220 such that the support simultaneously is connected to a main circuit board 400. The main circuit board 400 is fixed to the support 314 with a bolt 360 which passes from the outside through insertion holes 228 and 410 in the bottom case 226 and main circuit board 400, respectively, and engages with the bolt hole 319 of the support 314.

When the support 314 is joined to the bottom case 226, as in the above, the hinge member 320 is positioned inside, or encased within, both ends of the top case 224 of the main body housing 220, while the pivot-bracket assembly 330 passes through the top case 224 and is received inside the display housing 210. The pivot-bracket assembly 330 is fixed to a lower, inside part of the display housing 210 with fasteners, such as screws 334, which pass through the joining holes 332 of the pivot-bracket assembly 330, as shown in FIG. 2.

As a result of the above connection of the hinge assembly 300 with the display housing 210 and main body housing 220, the display housing 210 is rotatably connected to the main body housing 220.

In order to reinforce the connection of the hinge assembly 300 with the main body housing 220, the hinge assembly 300 is fixed to a bracket 370, mounted inside the main body housing 220 for use as an input/output jack support. A fastener, such as a bolt 350, is coupled to the bolt insertion hole 312 of the horizontal bracket 310, as shown in FIG. 2.

The hinge assembly structure of the present invention prevents the top case 224 from being overloaded by the weight of the display housing 210 when it is being opened or maintained in a fully opened state. This is realized through the hinge assembly 300 which, unlike typical portable computers, is fixed to the bottom case 226 of the main body housing 220. As a result, the weight of the display housing 210 is not concentrated on the top case 224, but dispersed over a larger area of the bottom case 226.

Also, because the hinge assembly 300 is connected to the main circuit board 400, induced current generated in the main circuit board 400 is grounded better than in typical portable computers, resulting in a decrease in electromagnetic waves created in the main circuit board 400, thus improving the shielding of EMI. Also, because the jacks of the present computer are grounded with respect to the housing, display and main circuit board, the portable computer is less at risk of experiencing voltage surges due to electrostatic shocks or other known electrical phenomena.

The foregoing paragraphs describe a portable computer providing a connection between the upper case housing the variable visual display and the main body of the case with a hinge assembly, joined to a bottom of the main body of the case to allow the display to more securely rotate relative to the main body of the case, without damaging the case.

The present invention is not limited to the disclosed embodiments, but is intended to cover all modifications and improvements within the scope of the appended claims.

What is claimed is:

1. An apparatus for connecting a display housing and a main body housing of a portable computer, said main body housing including a top case, a bottom case and a main circuit board, said apparatus comprising:
   a hinge member;
   a pivot-bracket mounted on said display housing, and rotatably connected to said hinge member;
   a bracket having a first end connected to said hinge member and a second end;
   a support member having a first end and a second end, said first end being connected to said second end of said bracket and said second end of said support member being connected to said main circuit board;
   a first fastener received by said bottom case, said main circuit board and said support member, said first fastener providing exclusive electrical communication between said hinge assembly, said support member and said bottom case; and
   a second fastener received by said bracket and said main body housing, said second fastener providing exclusive connection between said hinge member and said main body housing, thereby providing reinforced support of the hinge member.

2. The apparatus of claim 1, wherein said display panel and said main circuit board are grounded with respect to said main body housing by said hinge member, said pivot-bracket, said bracket, said support member and said first fastener.

3. The apparatus of claim 1, wherein said hinge member and said bracket are horizontally disposed.

4. The apparatus of claim 3, wherein said support member is disposed perpendicular to said bracket.

5. The apparatus of claim 3, wherein said support member is disposed vertically.

6. The apparatus of claim 1, wherein said support member is disposed perpendicular to said bracket.

7. A portable computer, comprising:
   a main body housing which includes a top case and a bottom case;
   a display housing;
   a main circuit board mounted on said bottom case; and
   hinge assembly means for rotatable connecting said display housing to said main body housing;
   said hinge assembly means comprising:
   a hinge member;
   a pivot-bracket mounted on said display housing, and rotatably connected to said hinge member;
   a bracket having a first end connected to said hinge member and a second end;
   a support member having a first end and a second end, said first end of said support member being connected to said second end of said bracket, and said second end of said support member being connected to said main circuit board;
   a first fastener received by said bottom case, said main circuit board and said support member, said first fastener providing exclusive electrical communication between said hinge assembly means, said support member and said bottom case; and
   a second fastener received by said bracket and said main body housing, said second fastener providing exclusive connection between said hinge assembly means and said main body housing, thereby providing reinfored support of said hinge assembly means.

8. The portable computer of claim 7, wherein said hinge member and said bracket are horizontally disposed.

9. The portable computer of claim 8, wherein said support member is disposed perpendicular to said bracket.

10. The portable computer of claim 8, wherein said support member is disposed vertically.

11. The portable computer of claim 7, wherein said support member is disposed vertically.

12. A method for connecting a display housing and main body housing of a portable computer, comprising the steps of:
   providing a main body housing with a support extending from a bottom case thereof toward a top case thereof;
   mounting a main circuit board on said bottom case;
   connecting a hinge assembly to said main circuit board, said hinge assembly comprising:
   a hinge member;
   a pivot-bracket mounted on a display housing, and rotatably connected to said hinge member;
   a bracket having a first end connected to said hinge member and a second end;
   a support member having a first end and a second end, said first end of said support member being connected to said second end of said bracket and said second of said support member end being connected to said main circuit board;
   connecting said bottom case, said main circuit board and said support member with a first fastener, said first fastener providing exclusive electrical communication between said hinge assembly and said bottom case, said first fastener and said main circuit board providing exclusive contact with said support member;
   mounting a further bracket on said main body housing; and
   connecting said hinge member and said further bracket with a second fastener, said second fastener providing exclusive connection between said hinge assembly and said further bracket.

13. The method of claim 12, wherein said display panel and said main circuit board are grounded with respect to said main body housing by said hinge member, said pivot-bracket, said bracket, said support member and said first fastener.

* * * * *